No. 810,930. PATENTED JAN. 30, 1906.
W. FENNELL & W. P. PERRY.
STORAGE BATTERY.
APPLICATION FILED MAR. 6, 1905.

UNITED STATES PATENT OFFICE.

WILLIAM FENNELL AND WILLIAM PAGDEN PERRY, OF LEYTONSTONE, ENGLAND.

STORAGE BATTERY.

No. 810,930.        Specification of Letters Patent.        Patented Jan. 30, 1906.

Application filed March 6, 1905. Serial No. 248,778.

*To all whom it may concern:*

Be it known that we, WILLIAM FENNELL and WILLIAM PAGDEN PERRY, citizens of the United Kingdom of Great Britain and Ireland, and residents of Leytonstone, England, have invented certain new and useful Improvements in Storage Batteries, of which the following is a specification, such as will enable others skilled in the art to which it appertains to make and use the same.

This invention relates to electric accumulators or secondary electrolytic cells; and it consists in means for supporting the active matter and for introducing it to intimate contact with the electrolyte.

In accumulators of the pasted type as at present constructed, using plates containing or coated with the active material, the greater part of the electrolyte is external to the plate, while the charge and discharge of the mass of material depends entirely upon the diffusion of the electrolyte into the body of the plate. This acts very disadvantageously in limiting the rates of charge and discharge and in reducing the capacity at high rates and causes excessive action, gassing, and disintegration. This is more especially a characteristic of a lead cell and renders it necessary to use many thin plates for high discharge rates. Any great increase in porosity of the active material by adding soluble substances to the paste or by other means has so far been attended by increased weakness.

According to our invention we very greatly increase both the porosity and the strength of an electrode. While we provide a permanent support for the active material and bring every part of it into contact with the electrolyte, we at the same time provide for the prompt escape of gas and for the circulation of the electrolyte.

Figure 3:
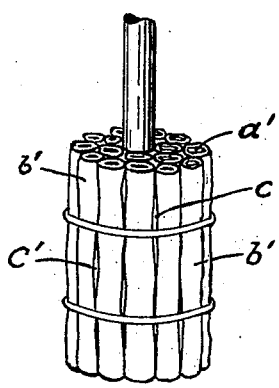
Figure 4:
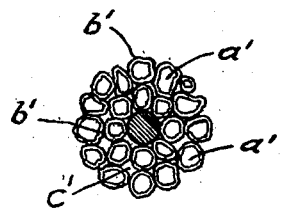

We use a hard porous non-conducting substance insoluble in the electrolyte in the form or shape of a network, honeycomb, or framework, so as to contain the electrolyte in the plate itself and at the same time to act as a support for the active material, which we spread over the surface in the form of a thin film or layer. The subdivisions or ramifications comprising the honeycomb or network should preferably be as numerous and of as small size as is consistent with mechanical strength. It will be readily seen that a network or honeycomb of substance involves a network or honeycomb of area. Therefore we may describe our invention in other words as a "non-conducting insoluble mass pierced in more than one direction with intercommunicating passages or holes," thus, in effect, producing a network or honeycomb of passages or holes as space for electrolyte, the hard rough walls of which passages or holes are lined or coated with a thin layer or film of active material. We do not of necessity make the mass (which forms the network of passages) of one piece only. For instance, one form of our invention which we have found particularly effective consists of a number of rough burnt-clay rods of irregular shape each covered with a film of active matter and held together in a bundle by india-rubber rings, yarn, or other suitable means. A piece of metallic wire or rod is placed in the center of the bundle to serve as conductor, as shown in Figs. 3 and 4; but the manner of insuring contact of our electrode with the conductor forms no part of this invention.

Our construction, in effect, increases the thickness of a plate and can be carried to such an extent that the plates may become blocks and may be packed quite close together, filling the cell solid, being merely separated by a porous partition. It is not essential, however, to carry the process thus far. We have found pumice to be a most effective material by reason of its rough surface, its great porosity, and low specific gravity, it being also unacted upon by ordinary electrolytes. We may, however, use other substances separately or in combination—such as earthenware or other burnt clay, asbestos, slate, soapstone, or the like—in the forms of tubes, rods, or irregularly-shaped pieces or a honeycomb or network, preferably with a hard rough irregular surface. We also may pierce the block or plate with additional holes or passages to hold a surplus of the electrolyte. These additional holes are preferably in the direction of the natural path of the current in the electrolyte to lower the internal resistance. It is also preferable to incline these holes upward in order to facilitate the escape of gas. We easily contain the whole of the electrolyte in the plate itself. The coating of the honeycombed mass with the thin film or skin may be done by any convenient means, such as by damping it with a liquid and dusting or blowing through with active or conducting powder until the required thickness of film is formed, or a thin layer of active matter may be precipitated chemically out of a solution, or it may be held in mechanical suspension and allowed to settle on the surface, or the network or rods or the like may be alternately dipped in an emulsion of active material and allowed to dry. If necessary, we increase the thickness of the layer by any usual means, such as by electrodepositing from a solution. Any active matter may be used in our invention—such as, for instance, for the positives the oxids of lead, iron, nickel, copper, or cobalt—or for the negative electrodes—such as lead, zinc, cadmium, copper, or manganese.

In the accompanying drawings we illustrate a few of the many forms which can be employed for the purposes of our invention.

Figure 1:
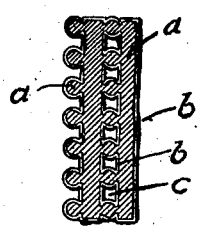
Figure 2:
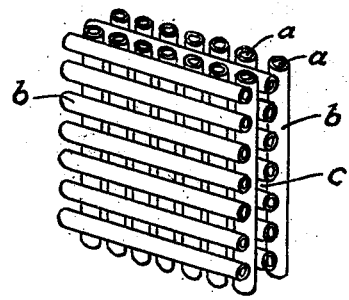
Figure 6:
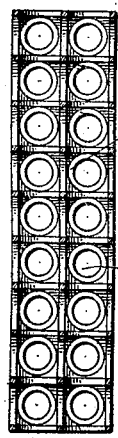
Figure 5:
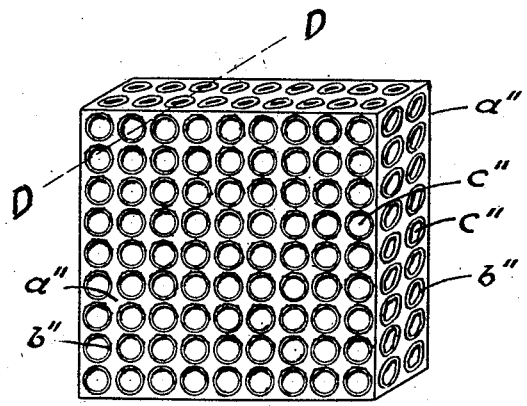

Figure 1 is a sectional view of a network-support shown in perspective in Fig. 2 and covered with a film of active material. Fig. 3 is a perspective view of a number of irregular rods forming a network-support, said rods being held together by bands and having a conductor arranged centrally in the bundle. Fig. 4 is a plan view of Fig. 3. Fig. 5 is a perspective view of another network-support in the form of a block pierced by intercommunicating holes or channels which are lined with active material. Fig. 6 is an enlarged section view taken on the line D D of Fig. 5.

As we have already stated, our electrodes may be made to contain the whole of the necessary electrolyte, and no other space for electrolyte is necessary, and we may therefore fill the entire space in containing box with the electrode with the exception of thin separators made of any suitable material—such as corrugated perforated ebonite, asbestos cloth, burnt clay, or of any material usually used in the manufacture of porous partitions in galvanic batteries. We even prefer to form the blocks or electrodes in position even where they appear to already fill the cell solid. Such pressure as is created is beneficial in solidifying the mass and insures good contact with the conductors. We also preferably pierce the blocks with additional vertical or inclined holes to facilitate the egress of gas, as otherwise the gas is liable to drive up the electrolyte in making its escape.

In our electrodes the thin layer of active matter has so very large a surface, and therefore the formation of gas distributed over so large an area, that it escapes almost as soon as formed and can never cause disintegration of the active matter. Therefore a prolonged and high rate of current may be sustained during the whole charge or discharge, as there is no need for any rapid circulation of the electrolyte, as each particle of active material has in actual contact with it the proper amount of electrolyte to completely charge or discharge it.

What we claim, and desire to secure by Letters Patent, is—

1. An electrode comprised of a non-conducting mass insoluble in electrolyte pierced in more than one direction with intercommunicating passages, the walls of the passages being lined with active material.

2. An improved electrode for electric accumulators consisting of a non-conducting honeycombed support on the exposed surfaces of which active material is spread in such a manner as not to fill the interstices completely.

3. An improved electrode for electric accumulators built up of a number of separate pieces of non-conductive substances, in the form of a honeycombed support on the exposed surfaces of which active material is spread so as not to fill the interstices completely.

4. An improved electrode for electric accumulators consisting of a non-conducting support pierced by intercommunicating passages on the walls of which active material is spread so as not to fill the interstices completely.

5. An improved electrode for electric accumulators consisting of a hard rough non-conducting support pierced in different directions by intercommunicating passages, on the exposed surfaces of which active material is spread so as not to fill the interstices completely.

In witness whereof we have hereunto set our hands in presence of witnesses.

WILLIAM FENNELL.
WILLIAM PAGDEN PERRY.

Witnesses to the signature of the said William Fennell:
    WILL. R. HANCOX,
    FRED. ATKINSON.

Witnesses to the signature of the said William Pagden Perry:
    WALTER J. SKERTEN,
    GEO. J. B. FRANKLIN.